Nov. 4, 1969    R. F. WEEKS    3,476,483
MOTION MEASURING APPARATUS
Filed Aug. 16, 1966    3 Sheets-Sheet 3

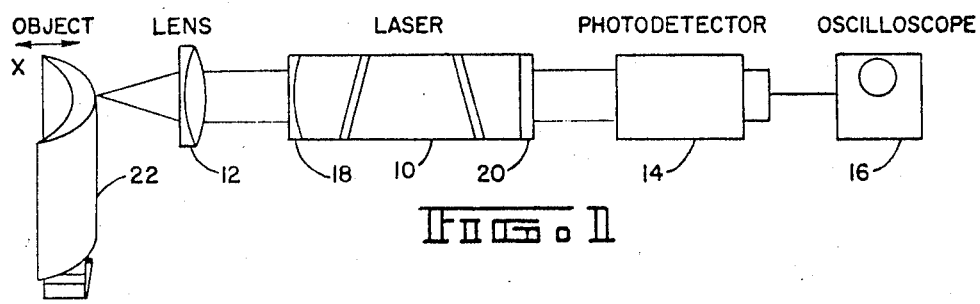
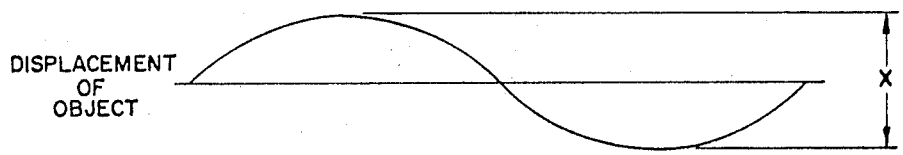
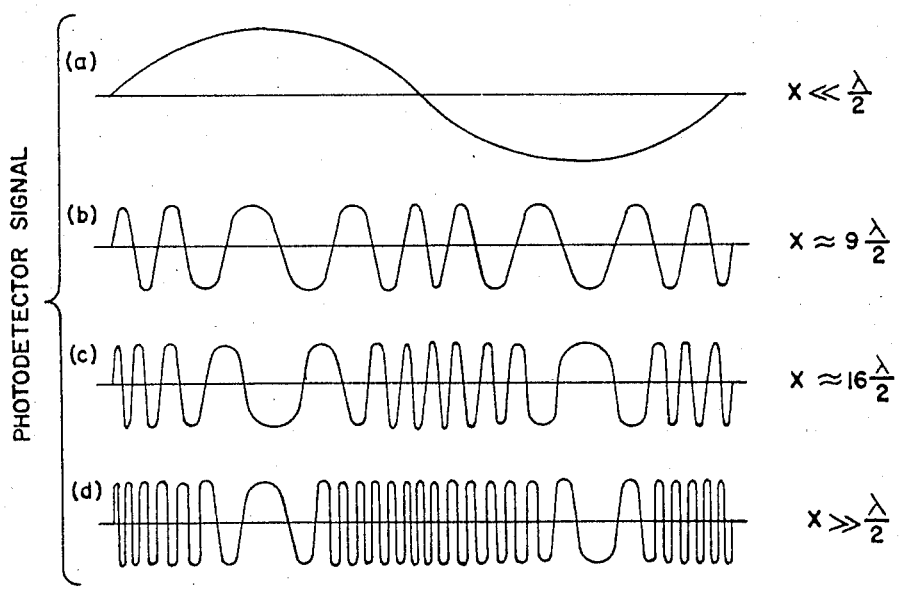

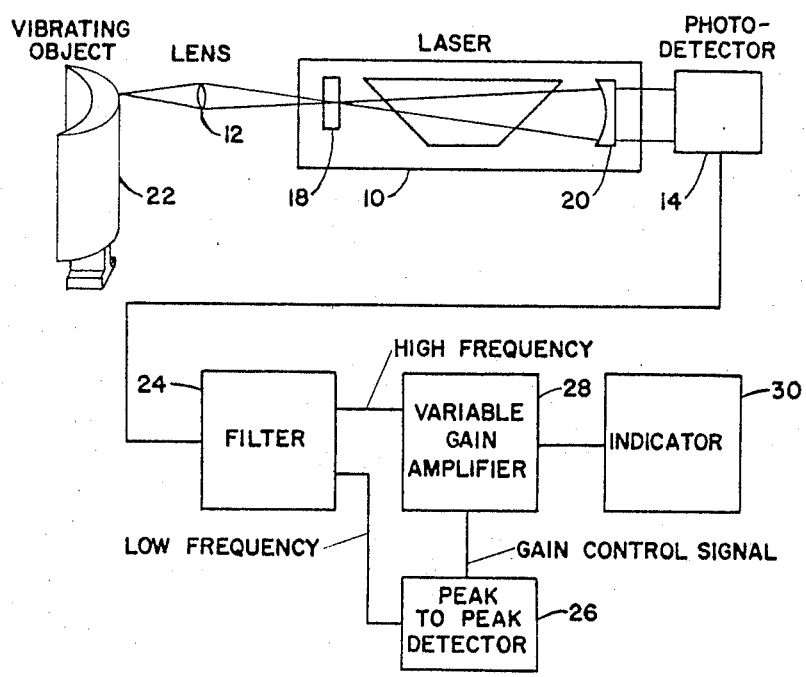

INVENTOR.
RICHARD F. WEEKS
BY Fishman & Van Kirk
ATTORNEYS.

United States Patent Office  3,476,483
Patented Nov. 4, 1969

3,476,483
MOTION MEASURING APPARATUS
Richard F. Weeks, Bristol, Conn., assignor to Carson Laboratories, Inc., Bristol, Conn., a corporation of Connecticut
Filed Aug. 16, 1966, Ser. No. 572,769
Int. Cl. G02b 27/32; G01b 11/00
U.S. Cl. 356—256                                12 Claims This invention relates to the measurement of parameters of the motion of a moving surface. More particularly, this invention is directed to measurement of the displacement and/or velocity of an object in motion.

As is well known, measurement of the parameters of the motion of vibrating objects is often exceedingly difficult. The difficulties arise for many reasons not the least of which is the fact that it is virtually impossible to affix or attach motion sensors, such as accelerometers, to the object to be observed without influencing the velocity and/or displacement thereof. This is particularly true when it is desired to observe the motion of a test object in an environment such as a wind tunnel; wind tunnel tests generally dictating a small scale model which is easily influenced by the attachment of sensors. When it is impossible or impractical to attach sensors directly to the object to be observed, a series of photographs may be taken of the object thereby enabling a physical measurement of displacement and a calculation of velocity. As should be obvious, such photographic methods are quite susceptible to human error.

The present invention permits the accurate measurement of the displacement and/or velocity of a vibrating object without physical contact therewith. In accordance with the present invention, the motion of the body is optically sensed. To be more specific, the present invention involves the focusing of a beam of coherent light at or near a surface of the object whose motion is to be sensed, the coherent light emanating from a laser which is usually operated just above its threshold level. The moving surface will cause scattering of the coherent light, a portion of the scattered light being returned to the laser. The returned light modulates the intensity of the laser. By the use of appropriate means and circuitry to sense the variations in the intensity or energy density of the laser output, signals commensurate with displacement and/or velocity of the scattering surface (object being tested) may be generated and, if desired, displayed.

Accordingly, one object of the present invention is to sense the motion of a moving object.

Another object of the present invention is to measure a parameter of the motion of a moving object without physical contact therewith.

Still another object of the present invention is to optically measure one or more parameters of the motion of a moving object.

Still another object of the present invention is to provide a device for the simultaneous measurement of velocity and displacement of moving surfaces.

Still another object of the present invention is to provide a device to measure small displacements of vibrating objects.

Still another object of the present invention is to measure parameters of motion of a vibrating object by employing light scattered from a surface thereof to modulate the energy density of a laser.

Still another object of the present invention is to vary the Q of a laser cavity by means of light scattered from a surface of a moving object, the intensity of the output of the laser being modulated in accordance with the change in Q to provide an output signal commensurate with a characteristic of the motion of the object.

The present invention may be better understood and additional objects and advantages thereof will become readily apparent to those skilled in the art by reference to the accompanying drawing wherein like reference numerals refer to like elements in the various figures and in which:

FIGURE 1 is a block diagram of a first embodiment of the present invention.

FIGURE 2 depicts a plurality of wave forms representing motion of the object and output signals provided by the apparatus of FIGURE 1 for varying magnitudes of displacement of the object.

FIGURE 3 is a block diagram of a second embodiment of the present invention particularly well suited to measuring small displacements.

Figure 4:
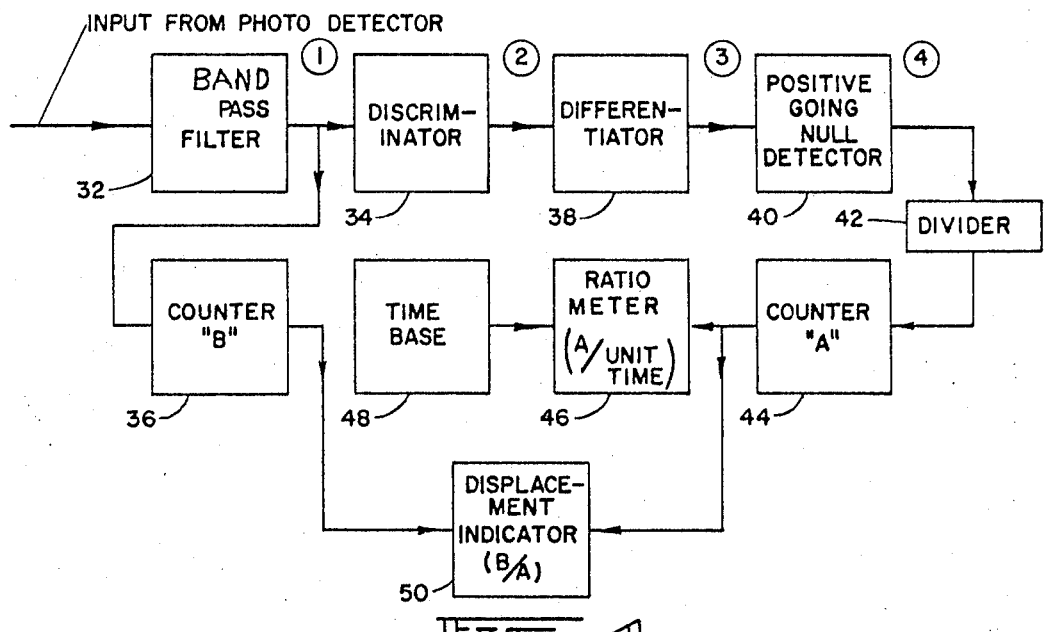
FIGURE 4 is a block diagram of circuitry which may be employed in the embodiment of FIGURE 1 to automatically and accurately measure the velocity and displacement of objects whose total displacement is relatively large.

Referring now to FIGURE 1, the embodiment shown comprises a continuous gas laser 10 such as a helium-neon gas laser, a lens 12, a photodetector 14 and an oscilloscope 16. Laser 10 includes partially reflective mirrors 18 and 20 positioned at the ends of and thus defining its optical cavity. The laser is operated just above its threshold level and coherent light transmitted through mirror 18 is focussed by lens 12 at or adjacent to a surface of the test object 22. As shown in FIGURE 1, object 22 comprises a turbine blade which, during the test to be conducted, will be subjected to forces which will cause deflection of the blade. This deflection will result in movement of the surface exposed to the coherent light from laser 10 toward and away from the point of focus of the coherent light.

Some of the light scattered from the surface of object 22 is refocused by lens 12 and re-enters the optical cavity of the laser through partially reflective mirror 18. The angle of incidence of the light from laser 10 upon the surface of object 22 is not critical providing the surface of the object is a good light scatterer. That is, unless the surface of object 22 is unusually rough, the present invention may be used to measure the magnitude of the displacement and the velocity of the object during its motion. The scattered light re-entering the optical cavity from the moving object has the same effect as a small change in the reflectivity of mirrors 18 and 20 which define the optical cavity. Since the Q of the optical cavity is very high, a small change in reflectivity will produce a relatively large change in the energy density within the cavity. Restated, coherent light returned to the optical cavity of the laser increases the energy density within the laser cavity by, in effect, varying the reflectivity of the cavity defining mirrors.

As object 22 moves toward and away from the focal point of the coherent light passed through mirror 18, the scattered light which re-enters the laser cavity is alternately in and out of phase with that being emitted by the laser. When in phase with the light being emitted by the laser, the re-entering light scattered from the surface of the test object causes an increase in the energy density inside the optical cavity by effectively increasing the reflectivity of the cavity defining mirrors. When out of phase with the emitted light the re-entering light causes a decrease in the energy density within the optical cavity.

Photodetector 14, which is physically positioned adjacent the back of the optical cavity, measures the intensity of the coherent light passed through partially reflective mirror 20. Thus, photodetector 14 measures the intensity of a beam of coherent light which is a fixed fraction of the internal energy density of the laser 10. The output of the photodetector will therefore consist of a large signal corresponding to the average value of the laser output modulated by a smaller signal corresponding to the effective change in Q or reflectivity of the cavity defining mirrors produced by the light scattered from the surface of moving object 22. If $x$ is the change in distance from moving object 20 to lens 12, i.e. the displacement of the object, and $\lambda$ is the wavelength of the laser emission, the modulated term $I_m$ will be given by:

$$I_m = A I_o \sin \frac{2\pi x}{\lambda/2} = I_o \sin \frac{4\pi x}{\lambda}$$

where $I_o$ is the average laser output and A is a constant representing the percentage modulation. Thus, the total instantaneous output I will be $$I = I_o + I_m = I_o \left(1 + A \sin \frac{4\pi x}{\lambda}\right)$$

As can be seen, the modulation term $I_m$ is periodic in $x$ with the period determined by the distance $\lambda/2$. Considering the object to be moving with a velocity $v$ which is essentially constant during the time $t$ it moves the distance $x$ then:

$$I_m = I_o A \sin \frac{4\pi v t}{\lambda}$$

and the frequency of the modulating signal is:

$$f = \frac{4\pi v}{\lambda}$$

If one observes an object whose displacement is approximately sinusoidal with a frequency of $f_n$, as is shown in the upper wave form of FIGURE 2, the output of the photodetector varies as shown in the other wave forms of FIGURE 2. These latter four wave forms would, of course, be displayed by oscilloscope 16.

FIGURE 2(a) depicts the situation where the total displacement of object 22 is less than $\lambda/2$. Maximum amplitude modulation of laser output is realized when displacement of object 22 equals $\lambda/2$. That is, the full possible or potential amplitude modulation of laser output is accomplished with a displacement of $\lambda/2$. When displacement is less than $\lambda/2$, intensity of laser output is amplitude modulated a percentage of the potential amount at a frequency equal to the frequency of the vibrating object 22, the modulation of the laser energy density in this case being directly proportional to displacement. Thus, under this condition where the amplitude modulation of the laser output is directly proportional to displacement, the displacement may be easily observed directly on oscilloscope 16 by observing the amplitude modulation of laser output. Velocity or vibratory frequency of the object may, accordingly, also be determined directly on oscilloscope 16 by observing the frequency of the modulated signal.

FIGURES 2(b), 2(c) and 2(d) depict situations where the total displacement of object 22 is greater than $\lambda/2$. When displacement of object 22 is greater than $\lambda/2$, the full potential amplitude modulation is repeatedly realized during each displacement, the full amplitude modulation being realized once for each multiple of $\lambda/2$. The frequency of this repeated total amplitude modulation is proportional to the speed of displacement, and thus it can be said that the amplitude of laser output is frequency modulated at a frequency dependent on the speed of displacement. The modulation of the laser energy density and hence the frequency of the output signal from photodetector 14 approaches zero at the maximum and/or minimum displacements (i.e. as the object slows and reverses direction) because it takes a relatively long time for the object to move a half wavelength at these extremes. The frequency of the amplitude modulation approaches its maximum value in between these extremes of motion at the maximum velocity of the object. Thus, the displacement at any instance of time from the zero or rest position can be determined from the number of peaks in the signal displayed on oscilloscope 16, and the velocity of the object is, accordingly, a function of the reciprocal of the time between peaks.

To summarize the foregoing, a small fraction of the coherent light from laser 10 incident on the vibrating object 22 is scattered back and re-enters the laser cavity. The relative phase of this returned light with respect to that emitted by the laser is determined by the length of the optical path from the cavity to the scattering surface and therefore varies as the object vibrates. The re-entrance light interferes with the laser emission and produces a modulation of the laser output which is detected by the photodetector 14. For displacements much smaller than a half wavelength at the frequency of operation of the laser, the amplitude modulation of the laser output is proportional to a displacement. When the displacements are large compared to a half wavelength at the laser operating frequency, the amplitude of the modulation of laser output is constant at a frequency proportional to the instantaneous velocity of the object.

In the embodiment of FIGURE 1, the modulation of the laser by the light returned from the surface of the moving object was displayed on oscilloscope 16 and displacement and velocity of the object calculated after observation of the oscilloscope display. In the embodiments of FIGURES 3 and 4 means are shown to electronically measure and display displacement and velocity. As will be obvious to those skilled in the art, the use of an oscilloscope as disclosed in FIGURE 1 introduces the possibility of certain inaccuracies in displacement measurement. In addition to human error, there are two problems in measuring small displacements accurately. In most environments, the laboratory and objects in it are constantly in random motion due to vibration of the structure introduced by machinery. This motion or "rumble" generally has peak displacements on the order of a micron in a frequency range of from less than a cycle to about 30 cycles per second. This rumble can obscure the desired signals. The second limitation is inherent in continuous gas lasers. While the laser cavity can be adjusted to operate in a single transverse mode, providing a uniphase output, oscillation generally occurs in several longitudinal modes simultaneously. The exact division of power between several longitudinal modes is critically dependent upon the cavity spacing, and it changes with a period on the order of seconds due to thermal variations. This change in modal configuration thus may give rise to a thermally induced variation in the sensitivity of the displacement measuring apparatus.

Circuitry for overcoming both of the above outlined problems and for utilizing the rumble for automatic gain control is shown in the block diagram of FIGURE 3, the FIGURE 3 circuitry being intended for measuring displacements of less than $\lambda/2$. The output from photodetector 14 is applied to a filter 24 which has a crossover frequency on the order of 100 to 300 cycles per second. Filter 24 separates the desired signal of relatively higher frequency object vibration from the relatively lower frequency rumble. Since the rumble displacement is generally greater than a wavelength at the operating frequency of laser 10, the rumble signal amplitude is independent of displacement of the object but may vary in time in dependence upon the total gain of the laser system. The low frequency or rumble signal separated by filter 24 is then applied to a detector 26 wherein it is full wave rectified and produces a D.C. voltage having a time constant on the order of tenths of a second. The output voltage from detector 26 has a magnitude which averages the random variations in a rumble about a selected reference level and responds to temperature induced variations in the gain of the laser. The signals thus derived from rumble variations are used to control the gain of amplifier 28 which has the high frequency or information carrying signal passed by filter 24 applied as an input thereto. By suitably choosing the parameters of the control loop, i.e. detector 26, the amplification of the desired signal by amplifier 28 can be varied so as to remove the effects of variations of system gain due to mode changing in the laser.

Output meter or indicator 30 displays a signal which is proportional to the amplitude of the vibration of object 22. It will be observed that the signal on indicator 30 has been compensated for changes in gain of the entire system to insure a continuously accurate reading.

In some cases the environment may be sufficiently stable so that there is no significant background rumble. Under such circumstances, automatic gain control can still be accomplished through the generation of a control signal by vibrating lens 12 along the axis of laser light with an electromagnetic drive. Filter 24 would then be sharply tuned at electromagnetic driving frequency.

Employing the embodiment of FIGURE 3 and using a gas laser operating in a hemispherical mode on the 6328 A. neon line, displacements on the order of 10 angstrom units ($10^{-7}$ centimeters) at a frequency of 40 kc. have been measured optically. The embodiment of FIGURE 3, of course, will not measure small displacements below the crossover point of filter 24.

Figure 5:
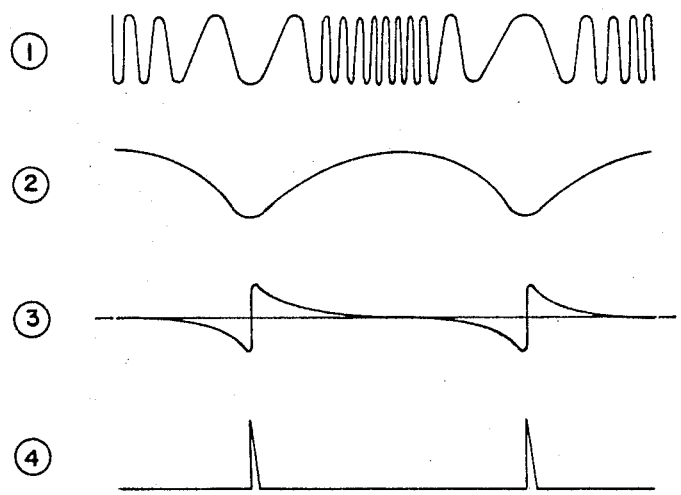
FIGURE 5 depicts a plurality of wave forms as they might appear at various points in the circuitry of FIGURE 4.

Referring now to FIGURES 4 and 5, circuitry is shown which may be used to produce digital or analog output signals proportional to the displacement and frequency of an object vibrating with a total displacement greater than $\lambda/2$. In this circuitry, a band pass input filter 32 is connected to photodetector 14. Filter 32 rejects any low frequency rumble signals which may be present and passes the information signal as depicted in waveform 1 of FIGURE 5. Waveform 1 is also simultaneously applied to a frequency discriminator circuit 34 and a counter 36. Discriminator 34 produces a voltage, waveform 2 of FIGURE 5, which is proportional to the instantaneous frequency of the signal from photodetector 14. The output signal from discriminator 34 is differentiated in a differentiator 38 to provide an output signal whose wave form is as shown in wave form 3 in FIGURE 5. The output of differentiator 38 is, as may be seen from wave form 3, a signal which passes through the zero value at each frequency extreme. A positive going null detector 40 receives waveform 3 and senses the frequency minima of wave form 1. Detector 40 generates pulses at each frequency minimum thus producing pulsed wave form 4 of FIGURE 5. The pulses of wave form 4 are divided by two in a divider 42 and applied to a counting circuit 44, counter A. The frequency of the vibrating object is given by the number of counts per unit time as recorded by counter 44. The frequency output signal may thus be automatically computed and displayed by applying the output of counter 44 to a ratio meter 46 which has, as a second input thereto, the output of a clock or time base reference signal generator 48. Clock 48 feeds pulses to ratio meter 46 at a predetermined frequency to apply a time base to the output from counter 44.

The output of filter 32 is, as noted above, also applied to counter 36, counter B, which records the number of positive peaks in the information carrying signal. The output of counters 36 and 44 are applied to a displacement indicator 50 which displays the ratio of the number of pulses recorded by counter 36 to the number of pulses recorded by counter 44, which ratio is proportional to displacement of object 22.

In summary, the circuitry of FIGURE 4 has an output at ratio meter 46 proportional to the vibrating frequency of an object 22 which is displaced a distance greater than $\lambda/2$, and indicator 50 has an output proportional to the displacement of the object.

While preferred embodiments of the present invention have been disclosed, various modifications and substitutions may be made without departing from the spirit and scope of this invention. Thus, it is to be understood that this invention has been described by way of illustration and not limitation.

What is claimed is:
1. Vibration measuring apparatus for measuring vibratory motion of a body without physical contact therewith comprising:
   means for generating coherent light, the output of said light varying means being variable in accordance with light inputs thereto;
   means for directing light from said generating means to said vibrating body;
   means for returning light scattered from said vibrating body to said generating means, said returned light amplitude modulating the intensity of said coherent light in accordance with the displacement of said vibrating body and at the frequency of vibration of said body for total displacements of said body less than one half a wavelength of said coherent light; and
   sensing means, positioned to receive light from said generating means, for sensing the amplitude modulation of said coherent light and producing a signal commensurate with said modulation, the frequency of said signal being commensurate with the frequency of vibration of said body.

2. Vibration measuring apparatus as in claim 1 wherein said generating means includes:
   laser means, the displacement of said body being measured parallel to the axis of the laser light beam.

3. Vibration sensing apparatus as in claim 2 wherein said laser means comprises:
   a continuous wave laser.

4. Vibration measuring apparatus as in claim 2 further including:
   means connected to said sensing means for receiving said signal commensurate with modulation and producing an indication of the magnitude and frequency of the vibration of said vibrating body.

5. Vibration measuring apparatus as in claim 4 further including:
   compensating means connected between said sensing means and said indicating means for compensating said signal for variations in gain of said apparatus.

6. Vibration measuring means as in claim 5 wherein said signal contains undesired background noise and wherein said compensating means includes:
   filter means connected to said sensing means for separating said undesired noise from said signal;
   variable gain amplifier means connected to said filter to receive said signal after separation of said noise; and
   detector means connected to said filter and to said amplifier to receive said noise and generate a gain control signal for delivery to said amplifier.

7. Vibration measuring apparatus for measuring vibratory motion of a body without physical contact therewith comprising:
   means for generating coherent light, the output of said light varying means being variable in accordance with light inputs thereto;
   means for directing light from said generating means to said vibrating body;
   means for returning light scattered from said vibrating body to said generating means, said returned light modulating the coherent light at varying frequencies in accordance with the displacement of said vibrating body for total displacements of said body greater than one half a wavelength of said coherent light; and
   sensing means, positioned to receive light from said generating means, for sensing the modulation of said coherent light and producing a first signal commensurate with said modulation, the frequency of said first signal being commensurate with the speed of vibration of said body.

8. Vibration measuring apparatus as in claim 7 wherein said generating means includes:

laser means, the displacement of said body being measured parallel to the axis of the laser light beam.

9. Vibration sensing apparatus as in claim 8 wherein said laser means comprises:
a continuous wave laser.

10. Vibration measuring means as in claim 8 including:
means connected to receive said first signal from said sensing means and produce a second signal commensurate with the instantaneous frequency of said first signal;
differentiator means connected to receive said second signal and differentiate said second signal to produce a third signal;
positive going null detector means connected to said differentiator means to receive said third signal and generate pulses commensurate with the frequency minima of said first signal;
divider means connected to said detector means to receive said pulses from said null detector means and to divide said pulses by two;
first counter means connected to said divider means to count the output pulses from said divider means; and
means connected to said counter means to indicate the vibratory frequency of said object.

11. Motion measuring apparatus as in claim 10 further including:
second counter means connected to receive said first signal and count pulses in said first signal, and
indicator means connected to said first and second counters to indicate the ratio of pulses counted in said second counter to pulses counted in said first counter, said ratio being commensurate with displacement of said body.

12. Vibration measuring apparatus as in claim 2 wherein said laser means includes end reflectors, and wherein said means for returning light to the laser means includes means for directing scattered light through one of said end reflectors to the optical cavity of the laser.

References Cited

UNITED STATES PATENTS 3,326,078  6/1967  Clark et al.

RONALD L. WIBERT, Primary Examiner

T. R. MOHR, Assistant Examiner

U.S. Cl. X.R.

356—156